(12) United States Patent
Oshita et al.

(10) Patent No.: US 11,550,269 B2
(45) Date of Patent: Jan. 10, 2023

(54) ELECTRONIC TIMEPIECE, INFORMATION UPDATE CONTROL METHOD AND STORAGE MEDIUM

(71) Applicant: CASIO COMPUTER CO., LTD., Tokyo (JP)

(72) Inventors: Yuuki Oshita, Tokyo (JP); Kazuho Kyou, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 359 days.

(21) Appl. No.: 16/835,952

(22) Filed: Mar. 31, 2020

(65) Prior Publication Data

US 2020/0319604 A1   Oct. 8, 2020

(30) Foreign Application Priority Data

Apr. 2, 2019   (JP) .............................. JP2019-070298

(51) Int. Cl.
  *G04R 20/02*   (2013.01)
(52) U.S. Cl.
  CPC .................................... *G04R 20/02* (2013.01)
(58) Field of Classification Search
  CPC ......... G04R 20/02; G04R 21/04; G04R 21/02
  See application file for complete search history.

(56) References Cited

U.S. PATENT DOCUMENTS

2017/0064754 A1\* 3/2017 Choi ...................... H04W 76/19
2017/0277139 A1\* 9/2017 Nozawa .................. G01S 19/45

FOREIGN PATENT DOCUMENTS

| CN | 1749772 A | 3/2006 | |
|---|---|---|---|
| EP | 1637900 A1 \* | 3/2006 | ............. G01S 19/05 |
| JP | 2010-038798 A | 2/2010 | |
| JP | 2010-127672 A | 6/2010 | |
| JP | 2011-523709 A | 8/2011 | |
| JP | 2014-182119 A | 9/2014 | |

OTHER PUBLICATIONS

Notice of Reasons for Refusal dated Aug. 3, 2021 received in Japanese Patent Application No. JP 2019-070298 together with an English language translation.
First Office Action dated Jun. 8, 2021 received in Chinese Patent Application No. CN 202010238849.8 together with an English language translation.

\* cited by examiner

*Primary Examiner* — Eugene Yun
(74) *Attorney, Agent, or Firm* — Scully Scott Murphy & Presser (57) ABSTRACT

An electronic timepiece includes a radio wave receiver, a communication unit, a memory and a processor. The radio wave receiver receives radio waves from positioning satellites. The communication unit communicates with an external device. The memory stores a program and predicted positional information on the positioning satellites. Based on the program stored in the memory, in response to a predetermined condition for an elapsed time from a valid period of the stored predicted positional information being satisfied, the processor causes the communication unit to receive predicted positional information with other information from the external device when the communication unit receives the other information.

21 Claims, 4 Drawing Sheets

ELECTRONIC TIMEPIECE, INFORMATION UPDATE CONTROL METHOD AND STORAGE MEDIUM

CROSS-REFERENCE TO RELATED APPLICATIONS

This application is based upon and claims the benefit of priority under 35 USC 119 of Japanese Patent Application No. 2019-070298 filed on Apr. 2, 2019 the entire disclosure of which, including the description, claims, drawings, and abstract, is incorporated herein by reference in its entirety.

BACKGROUND OF THE INVENTION

Field of the Invention

The present disclosure relates to an electronic timepiece, an information update control method and a storage medium.

Description of the Related Art

There is a satellite positioning system that receives radio waves from positioning satellites and identifies the date and time and the current position.

In order to identify the current position, positional information (ephemeris(des)) on positioning satellites is needed. The positional information is included in radio waves transmitted from positioning satellites. However, it takes a long time to receive positional information from positioning satellites, which increases power consumption, and also it takes a long time to identify the current position first time. To deal with these, as disclosed in JP 2010-127672 A, there is a technology that obtains predicted positional information (predicted ephemeris) on positioning satellites in advance via a network and uses the predicted positional information when not holding positional information.

BRIEF SUMMARY OF THE INVENTION

According to a first aspect of the present disclosure, there is provided an electronic timepiece including:

a radio wave receiver receiving radio waves from positioning satellites;

a communication unit communicating with an external device;

a memory storing a program and predicted positional information on the positioning satellites; and a processor, based on the program stored in the memory, in response to a predetermined condition for an elapsed time from a valid period of the stored predicted positional information being satisfied, causing the communication unit to receive predicted positional information with other information from the external device when the communication unit receives the other information.

According to a second aspect of the present disclosure, there is provided an information update control method of an electronic timepiece including: a radio wave receiver receiving radio waves from positioning satellites; a communication unit communicating with an external device; and a memory storing predicted positional information on the positioning satellites, the information update control method including:

in response to a predetermined condition for an elapsed time from a valid period of the stored predicted positional information being satisfied, causing the communication unit to receive predicted positional information with other information from the external device when the communication unit receives the other information.

According to a third aspect of the present disclosure, there is provided a non-transitory computer-readable storage medium storing a program to cause a computer of an electronic timepiece including a radio wave receiver receiving radio waves from positioning satellites and a communication unit communicating with an external device, the storage medium further storing predicted positional information on the positioning satellites, to perform:

in response to a predetermined condition for an elapsed time from a valid period of the stored predicted positional information being satisfied, causing the communication unit to receive predicted positional information with other information from the external device when the communication unit receives the other information.

BRIEF DESCRIPTION OF THE SEVERAL VIEWS OF THE DRAWING

The accompanying drawings, which are incorporated in and constitute a part of the specification, illustrate embodiments, and together with the general description given above and the detailed description of the embodiments given below, serve to explain the principles of the present invention, wherein.

DETAILED DESCRIPTION OF THE INVENTION

Hereinafter, one or more embodiments of the present invention will be described with reference to the drawings.

Figure 1:
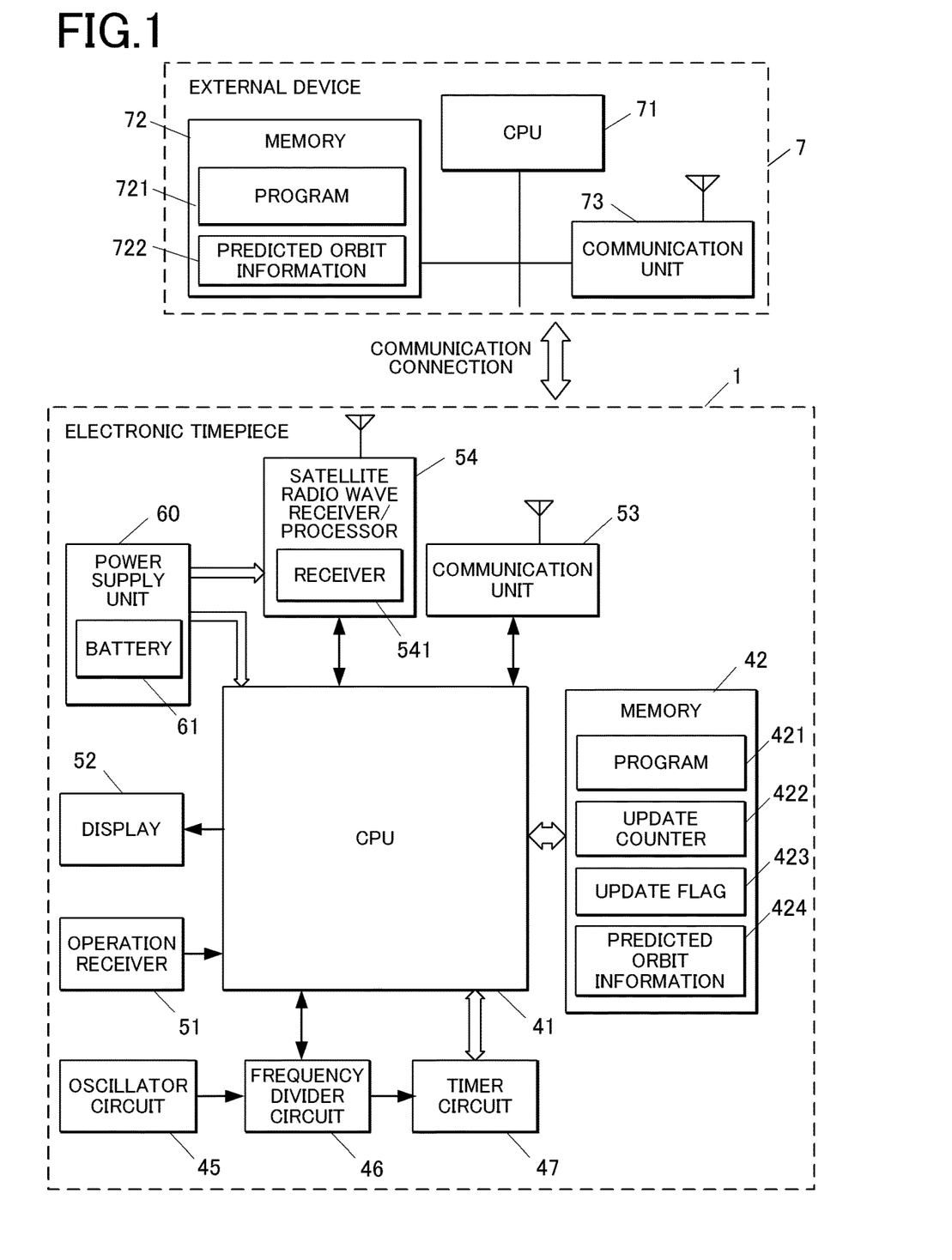
FIG. 1 is a block diagram showing functional configurations of an electronic timepiece and an external device according to an embodiment(s)

FIG. 1 is a block diagram showing functional configurations of an electronic timepiece 1 and an external device 7 according to an embodiment(s).

The electronic timepiece 1 includes a central processing unit (CPU) 41, a memory 42, an oscillator circuit 45, a frequency divider circuit 46, a timer circuit 47, an operation receiver 51, a display 52, a communication unit 53, a satellite radio wave receiver/processor 54 and a power supply unit 60.

The CPU 41 is a processor that performs various mathematical operations and overall control of operation of each component of the electronic timepiece 1. The CPU 41 reads and executes a program 421 stored in the memory 42, thereby performing various types of control. The CPU 41 causes the satellite radio wave receiver/processor 54 to perform positioning and date-and-time obtaining. The CPU 41 performs elapsed time counting (stopwatch operation) on the basis of signals output from the frequency divider circuit 46.

The memory 42 provides the CPU 41 with a memory space for work, and stores various data. The memory 42 includes, for example, a random access memory (RAM) and a nonvolatile memory. The RAM is used for the mathematical operations performed by the CPU 41 and stores temporary data. The nonvolatile memory is, for example, a flash memory, and stores various settings, the program 421 and so forth. The program 421 includes an information update control process described below.

The memory 42 also stores the value (counted value) of an update counter 422, an update flag 423, predicted orbit information 424 (predicted positional information) and so forth. The value of the update counter 422 is a value obtained by counting days elapsed from the last update of the predicted orbit information 424. The update flag 423 is a binary flag indicating whether or not the predicted orbit information 424 needs to be updated. In this embodiment, the value of the update flag 423 being "1" indicates that the predicted orbit information 424 needs to be updated. The predicted orbit information 424 is data of predicted orbits (predicted ephemeris(des)) of positioning satellites obtained from outside through the communication unit 53. The positioning satellites are, for example, global positioning system (GPS) satellites, but may be positioning satellites of another positioning system(s) in addition to or instead of the GPS satellites. Basic programs and data of initial settings of the electronic timepiece 1 may be stored in a read only memory (ROM) or the like and are not updated usually.

The oscillator circuit 45 generates and outputs a clock signal(s) of a predetermined oscillation frequency of, for example, 32.768 kHz to the frequency divider circuit 46. The frequency divider circuit 46 divides the clock signal input from the oscillator circuit 45, thereby converting the clock signal into a signal of a frequency that is necessary for each component of the electronic timepiece 1 to operate, and outputs the signal. The destination of the signal generated by the frequency divider circuit 46 includes the timer circuit 47.

The timer circuit 47 counts the signals of the frequency input from the frequency divider circuit 46 to calculate and hold the current date and time. The format of the current date and time held by the timer circuit 47 is not limited to the year, month, date, hour, minute and second format, and may be any format as long as it is suitable for processes performed by the CPU 41 and so forth. The oscillation frequency of the oscillator circuit 45 slightly changes according to the external environment, such as temperature. Under the normal environment, at the maximum, a deviation of about 0.5 seconds per day may occur in the date and time counted by the timer circuit 47. The CPU 41 may correct the deviation in the date and time counted by the timer circuit 47 on the basis of accurate current date-and-time information obtained from outside by the electronic timepiece 1 through, for example, the communication unit 53 and/or the satellite radio wave receiver/processor 54.

The operation receiver 51 receives input operations from outside, for example, from a user, and outputs input signals corresponding to the input operations to the CPU 41. The operation receiver 51 includes, for example, a push-button switch and/or a crown. The operation receiver 51 may include a touchscreen provided in such a way as to be superposed on a digital display screen of the display 52.

The display 52 performs display under the control of the CPU 41. The display 52 has, for example, the digital display screen, and performs digital display (presentation). The digital display screen is, for example, a liquid crystal screen or an organic electro-luminescent (EL) screen. Instead of or in addition to the digital display screen, the display 52 may have an analog display unit that displays information by hands pointing marks.

The communication unit 53 performs and controls data sending/receiving (data communications) to/from (with) external devices, such as the external device 7. In this embodiment, the communication unit 53 includes an antenna and a sending/receiving circuit, and performs short-range wireless communications, such as communications in accordance with Bluetooth®. The communication unit 53 can perform Low Energy communications in accordance with Bluetooth version 4 or later version (hereinafter "BLE communications"), and maintain a communication connection state unless (i) communication connection is disconnected in response to a disconnecting command (e.g. a command to shift to a mode in which transmission of radio waves is prohibited, a command to restrict operable functions due to shortage of charging capacity, etc.) or (ii) a link loss state occurs in which communications with the external device 7 as the destination of the communication connection is unavailable (e.g. a communication function of the external device 7 has been deactivated, distance to the external device 7 has become longer and consequently the communication unit 53 has not received radio waves from the external device 7 for a predetermined period of time corresponding to slave latency or longer, etc.). In the electronic timepiece 1, an connection interval(s) for the communication unit 53 to perform not data communications but communications for maintaining connection in the standby state (e.g. 1.0 sec. to 2.0 sec.) is set to be longer than that for the communication unit 53 to perform data communications (e.g. current date-and-time information and predicted orbit information sending/receiving, which is described below) (e.g. 30 msec. to 50 msec.) in response to a data sending/receiving command(s). In the electronic timepiece 1, setting may be performed to extend the communication interval as soon as data communications finishes or under a predetermined condition, for example, a condition that data communications has not been performed for a predetermined period of time, and to shorten the connection interval as soon as data communications occurs. This reduces power consumed by operation of the communication unit 53.

The satellite radio wave receiver/processor 54 includes a receiver 541 (radio wave receiver) including an antenna and a receiving circuit for receiving radio waves from the positioning satellites, and processes the received radio waves in various manners, for example, decodes the received radio waves, thereby identifying the current position (positioning) and obtaining the current date-and-time information. Operation of the satellite radio wave receiver/processor 54, operation of the receiver 541 in particular, consumes a larger amount of power than, for example, date-and-time counting and its display in the electronic timepiece 1 or BLE communications of the communication unit 53. Power supply to the satellite radio wave receiver/processor 54 may be separately switchable between ON and OFF from power supply to the entire electronic timepiece 1, which includes the CPU 41. The satellite radio wave receiver/processor 54 may be able to directly read the predicted orbit information 424 from the memory 42, not via the CPU 41. The read predicted orbit information 424 may be stored and held in a memory of the satellite radio wave receiver/processor 54. In this case, the predicted orbit information 424 in the memory 42 may be delated after read therefrom.

The power supply unit 60 includes a battery 61, and from the battery 61, supplies power with a predetermined voltage (may supply the power indirectly via the CPU 41 or the like) to each component of the electronic timepiece 1 to operate. The battery 61 includes, for example, a solar panel and a storage battery. Alternatively, as the battery 61, a detachable dry cell or button cell may be used. Still alternatively, the power supply unit 60 may have, as the battery 61, a secondary cell, such as a lithium-ion battery, which is charged by being connected to a power source through a cable or a connector terminal or by being electromagnetically coupled with a power source.

The external device 7 includes a CPU 71, a memory 72 and a communication unit 73.

The CPU 71 performs various mathematical operations and overall control of operation of the external device 7. The memory 72 stores temporary data for the mathematical operations performed by the CPU 71, and also stores a program 721, various data and so forth. The various data include predicted orbit information 722.

The communication unit 73 can perform short-range wireless communications (BLE communications) through which the communication unit 73 (external device 7) can communicate with the electronic timepiece 1, communications via the Internet (packet communications) using a wireless local area network (LAN) or the like, and telephone communications using a telephone line. The communication unit 73 can access an information providing server that provides predicted orbit information, which is described below, via the Internet.

The external device 7 is, for example, a smartphone, and may include components that smartphones usually have, such as a display, an operation receiver, a sound output unit, an informing unit that outputs beeps, vibrations and so forth, and a power supply unit.

Next, positioning will be described. In the electronic timepiece 1 of this embodiment, the satellite radio wave receiver/processor 54 performs a mathematical operation(s) for positioning on the basis of radio waves received from a plurality of positioning satellites, and outputs information on the current position to the CPU 41 one time, intermittently, or continuously. At the time, if the satellite radio wave receiver/processor 54 does not, from the positioning satellites, receive or hold the orbit information (ephemeris) that is valid (has a valid period), the satellite radio wave receiver/processor 54 obtains the current position of each positioning satellite using the predicted orbit information 424 (predicted ephemeris) and performs the mathematical operation for positioning.

The predicted orbit information has a valid period of, for example, about three to seven days, is updated about once a day, and is disclosed on a predetermined information providing server or the like. In this embodiment, for the sake of simplicity, it is assumed that the predicted orbit information that is valid from the start of a day is disclosed every day at the timing at which the date changes. However, this is not a limitation. The external device 7, which can access the information providing server, usually obtains the predicted orbit information every time the predicted orbit information is updated, namely every day. The electronic timepiece 1 obtains this predicted orbit information from the external device 7 through the communication unit 53. The external device 7 may use the predicted orbit information when the external device 7 itself performs positioning. When the external device 7 itself does not use the predicted orbit information, the external device 7 may not obtain the predicted orbit information on a day on which the predicted orbit information is not scheduled to be sent to the electronic timepiece 1 (e.g. the day after the predicted orbit information is sent to the electronic timepiece 1, which is described below).

The more distant the date is from the present time onward, the lower the accuracy of the predicted positions of the positioning satellites based on the predicted orbit information is. However, as described above, the predicted orbit information is frequently updated. Consequently, the valid period of the predicted orbit information is often sufficiently longer than the update interval thereof. Hence, in the electronic timepiece 1, the receiving frequency of the predicted orbit information can be set to be lower than the update frequency thereof. For example, when the valid period of the predicted orbit information is three days, and the electronic timepiece 1 has a receiving frequency of once every two days or less, the electronic timepiece 1 obtains updated predicted orbit information when the elapsed time from the start of the valid period of the current predicted orbit information becomes at least twice the update interval of the predicted orbit information disclosed on the information providing server, and the remaining time of the valid period becomes one day or less.

Figure 2:
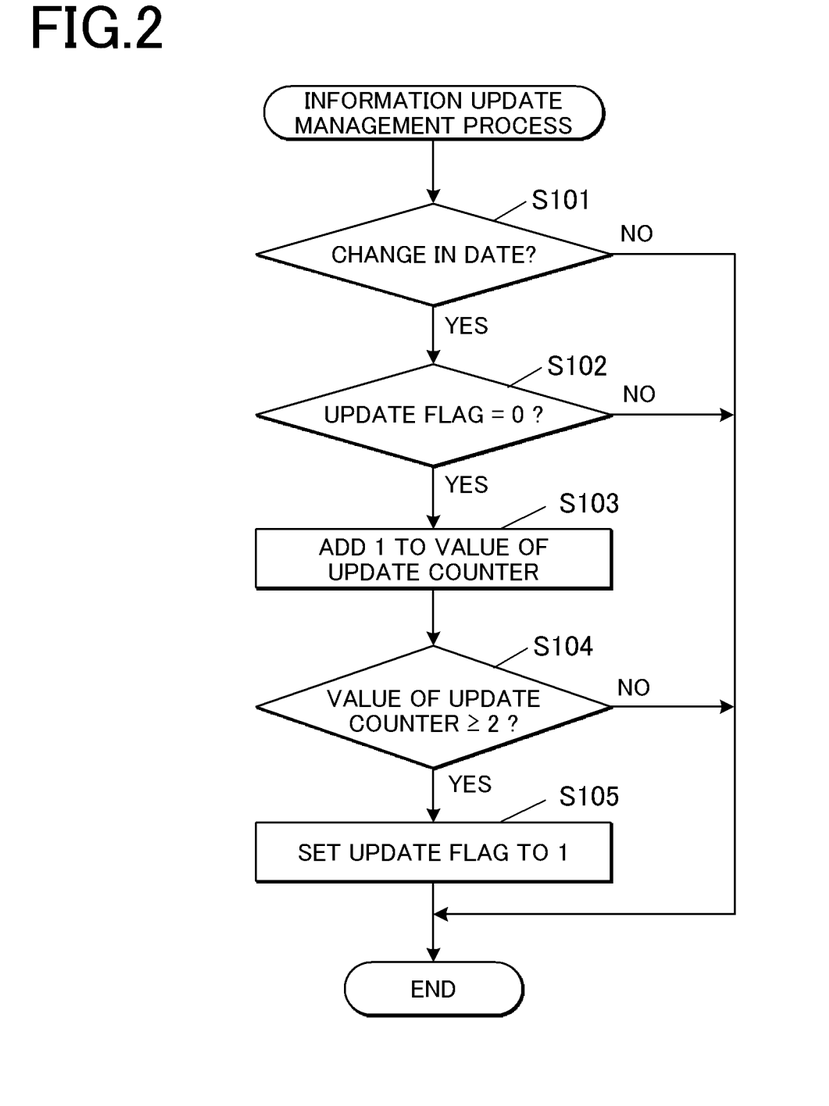
FIG. 2 is a flowchart showing a control procedure in an information update management process.

FIG. 2 is a flowchart showing a control procedure for the CPU 41 in an information update management process that is performed in the electronic timepiece 1. This information update management process is a process for determining whether or not update of the predicted orbit information 424 is needed. The information update management process is started regularly, for example, every minute or every hour, in tune with operation of the timer circuit 47, for example.

When the information update management process is started, the CPU 41 determines whether or not it is the timing at which the date changes, namely whether or not it is 0:00 (Step S101). If the CPU 41 determines that it is not the timing at which the date changes (Step S101; NO), the CPU 41 ends the information update management process.

If the CPU 41 determines that it is the timing at which the date changes (Step S101; YES), the CPU 41 determines whether or not the update flag 423 is "0" (update-unneeded setting) (Step S102). If the CPU 41 determines that the update flag 423 is not "0" (Step S102; NO), the CPU 41 ends the information update management process.

If the CPU 41 determines that the update flag 423 is "0" (Step S102; YES), the CPU 41 adds "1" to the value of the update counter 422 (Step S103). The order of Step S102 and Step S103 may be reversed. The maximum value of the update counter 422 may be a value that agrees with the number of valid days of the predicted orbit information. For example, the maximum value of the update counter 422 is "6" when the number of valid days is "7".

The CPU 41 determines whether or not the value of the update counter 422 is equal to or greater than "2" (Step S104). If the CPU 41 determines that the value of the update counter 422 is not equal to or greater than "2", namely it is not two or more days after the last update of the predicted orbit information 424 (Step S104; NO), the CPU 41 ends the information update management process. If the CPU 41 determines that the value of the update counter 422 is equal to or greater than "2", namely two or more days has elapsed from the start of the valid period of the predicted orbit information 424 updated last time and stored, and the remaining time of the valid period is one day or less (a predetermined condition for the elapsed time is satisfied; the predetermined condition may include time expected to elapse before the external device 7 obtains the predicted orbit information, which is described above) (Step S104; YES), the CPU 41 sets the update flag 423 to "1" (update-needed setting) (Step S105). The CPU 41 then ends the information update management process.

In this embodiment, the value of the update counter 422 is changed at the timing at which the date changes. However, if the external device 7 has a preset timing on each day at which the external device 7 obtains the predicted orbit information, the value of the update counter 422 may be changed at a predetermined time that is the same as or after the preset timing.

Even when the update flag 423 is set to "1", the electronic timepiece 1 of this embodiment does not perform data sending/receiving to/from the external device 7 through the communication unit 53 either immediately or at a preset obtaining time, to obtain the predicted orbit information only. That is, within a time range that satisfies the above receiving frequency (obtaining frequency), for example, on the day that is two or more days after the most recent (last) obtainment of the predicted orbit information, the electronic timepiece 1 sends a predicted orbit information request and receives the predicted orbit information subsequent to other information when the communication unit 53 receives the other information. This "other information" does not include control signals that are exchanged between the electronic timepiece 1 and the external device 7 for maintaining communication connection by BLE communications, and may or may not include control data for establishing connection when communication connection is established first time or when disconnected communication connection is reconnected.

Examples of the aforementioned other information received by the electronic timepiece 1 include, but are not limited to, the current date-and-time information. The electronic timepiece 1, which is continuously connected with the external device 7 by BLE communications, can correct the date and time counted by the timer circuit 47 by obtaining the current date-and-time information from the external device 7 with a frequency of once a day or higher. The external device 7 sends the current date-and-time information to the electronic timepiece 1 (i) when the external device 7 and the electronic timepiece 1 are reconnected after their communication connection is disconnected (and the date is different from the data of the last sending of the current date-and-time information if they are reconnected after link loss) or (ii) when the electronic timepiece 1 explicitly requests the external device 7 to send the current date-and-time information. When the electronic timepiece 1 and the external device 7 are reconnected after communication connection is disconnected in a normal manner, the electronic timepiece 1 may obtain the current date-and-time information regardless of change in the date, due to the possibility of change in time zone to which the current position belongs. In BLE communications, link loss frequently occurs every day (usually for a short period of time). Hence, a situation is not usually assumed where no disconnected communications or link loss occurs even once a day. Setting may be performed to compulsorily send/receive the current date-and-time information when communication connection is continuously maintained for a predetermined period of time or longer or from the start of a day to a predetermined time.

Figure 3:
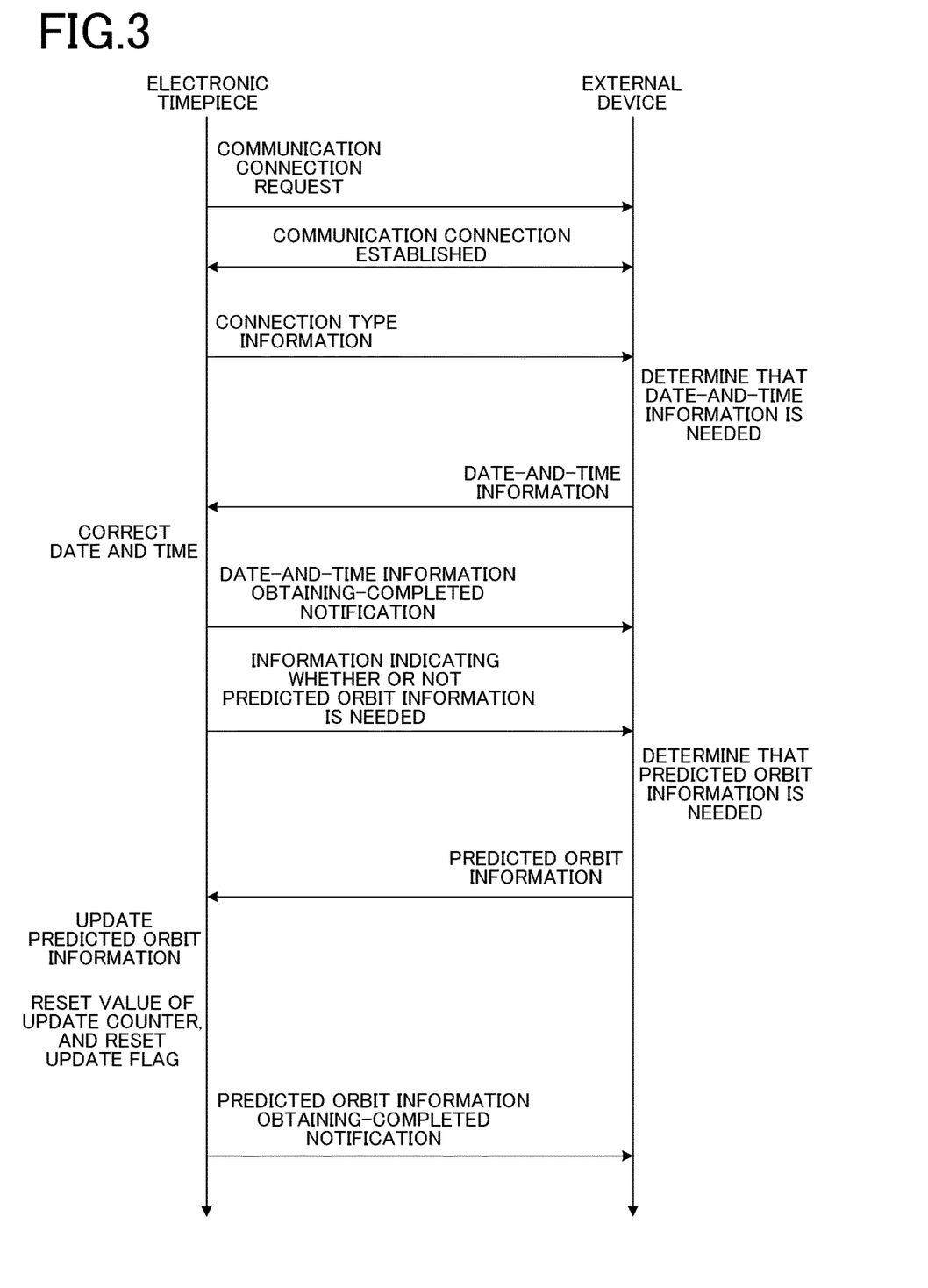
FIG. 3 is a sequence diagram showing communications and processes at the time of establishment of communication connection between the electronic timepiece and the external device.

FIG. 3 is a sequence diagram showing communications and processes at the time of establishment of communication connection between the electronic timepiece 1 and the external device 7.

The electronic timepiece 1 sends a communication connection request to the external device 7, and communication connection is established between the electronic timepiece 1 and the external device 7 when the external device 7 responds to the request and they exchange control data. Thereafter, the electronic timepiece 1 sends connection type information on the type of the connection (e.g. connection due to normal start, connection due to return from link loss, etc.) to the external device 7. When the electronic timepiece 1 is a slave, the external device 7 may request this information from the electronic timepiece 1. The connection type information may simply be information indicating whether or not the current date-and-time information is needed.

The external device 7 determines whether or not it is a timing to send the current date-and-time information to the electronic timepiece 1 on the basis of, for example, the connection type information. When determining that it is a timing to send the current date-and-time information, the external device 7 sends the current date-and-time information to the electronic timepiece 1. The electronic timepiece 1 corrects the date and time counted by the timer circuit 47 on the basis of the received current date-and-time information, and sends a date-and-time information obtaining-completed notification to the external device 7. Subsequently, the electronic timepiece 1 sends information indicating whether or not the predicted orbit information (predicted ephemeris) is needed to the external device 7.

When determining that the predicted orbit information is needed, the external device 7 promptly sends the holding predicted orbit information to the electronic timepiece 1 in response to the information indicating whether or not the predicted orbit information is needed. The electronic timepiece 1 receives the predicted orbit information subsequent to the current date-and-time information, which the electronic timepiece 1 has received earlier, updates the currently holding predicted orbit information 424 with the received predicted orbit information, and resets the update counter 422 and the update flag 423. The "subsequently", "subsequent to" or the like indicates that, between reception of the last data of the current date-and-time information (first timing) and reception of the first data of the predicted orbit information (second timing), data (e.g. the date-and-time information obtaining-completed notification, the information indicating whether or not the predicted orbit information, etc.) are exchanged without a more-than-necessary resting time (equivalent to one or more short connection intervals where no data except packet data for maintaining connection is sent/received), preferably zero, namely at every timing of each short connection interval, a request, a notification, data or the like is sent/received, but with the minimum resting time if required for processes, such as data reading/writing, and the interval between the first timing and the second timing is, at the longest, shorter than a time length for the electronic timepiece 1 and the external device 7 to shift to the abovementioned long connection interval(s), namely to shift to the standby state. From the start of the reception of the current date-and-time information until the end of the reception of the predicted orbit information, no control signal or the like for changing the connection interval is sent/received. When finishing updating the predicted orbit information, the electronic timepiece 1 sends a predicted orbit information obtaining-completed notification to the external device 7.

Figure 4:
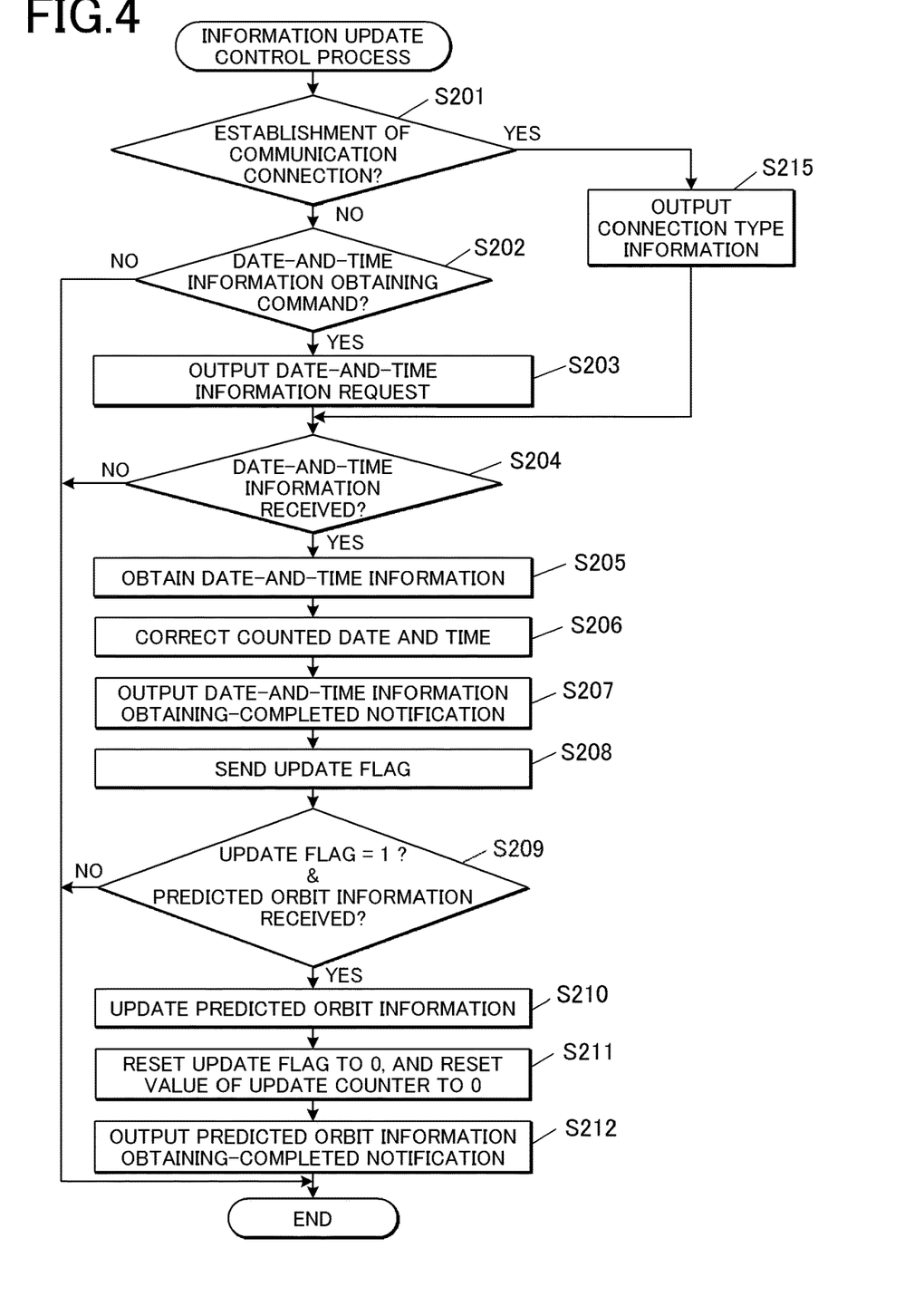
FIG. 4 is a flowchart showing a control procedure in an information update control process.

FIG. 4 is a flowchart showing a control procedure for the CPU 41 in an information update control process (that includes timing setting) that is performed in the electronic timepiece 1. This information update control process is an example of a control process for obtaining the predicted orbit information when the communication unit 53 obtains the current date-and-time information. The information update control process is called/read from the program 421 and started.

When the information update control process is started, the CPU 41 determines whether or not this is the time of establishment of communication connection (Step S201). If the CPU 41 determines that this is the time of establishment of communication connection (Step S201; YES), the CPU 41 sends the connection type information on the type of the communication connection to the external device 7 through the communication unit 53 (Step S215) and proceeds to Step S204.

If the CPU 41 determines that this is not the time of establishment of communication connection (Step S201; NO), the CPU 41 determines whether or not a date-and-time information obtaining command has been input on the basis of an input operation received by the operation receiver 51 (Step S202). If the CPU 41 determines that no date-and-time information obtaining command has been input (Step S202; NO), the CPU 41 ends the information update control process. If the CPU 41 determines that another process command has been obtained (input), the CPU 41 proceeds to a process corresponding to the obtained process command.

If the CPU 41 determines that a date-and-time information obtaining command has been input (Step S202; YES), the CPU 41 outputs a date-and-time information request to the external device 7 (smartphone) through the communication unit 53 to request the current date-and-time information (Step S203). The CPU 41 then proceeds to Step S204.

In Step S204, the CPU 41 determines whether or not the communication unit 53 has received the current date-and-time information from the external device 7 (Step S204). If the CPU 41 determines that the communication unit 53 has not received the current date-and-time information (Step S204; NO), namely, as described above, the date at the time of the establishment of the communication connection is not different from the date of the last reception of the current date-and-time information, the CPU 41 ends the information update control process.

If the CPU 41 determines that the communication unit 53 has received the current date-and-time information (other information, which is other than the predicted orbit information) (Step S204; YES), the CPU 41 obtains the received current date-and-time information (Step S205). The CPU 41 corrects the current date and time counted by the timer circuit 47 with the received current date-and-time information (Step S206). The CPU 41 outputs a date-and-time information obtaining-completed notification to the external device 7 through the communication unit 53 (Step S207).

The CPU 41, which has received (obtained) the current date-and-time information, subsequently sends the information indicating whether or not the predicted orbit information is needed, for example, the update flag 423, to the external device 7 through the communication unit 53 (Step S208; timing setting). The CPU 41 determines whether or not the value of the update flag 423 is "1" and whether or not the communication unit 53 has received the predicted orbit information from the external device 7 (Step S209). If the CPU 41 determines that the value of the update flag 423 is not "1" (update unneeded) or the communication unit 53 has not received the predicted orbit information (e.g. the external device 7 (smartphone) has not obtained updated predicted orbit information) (Step S209; NO), the CPU 41 ends the information update control process.

If the CPU 41 determines that the value of the update flag 423 is "1" (the predetermined condition is satisfied) and the communication unit 53 has received the predicted orbit information (Step S209; YES), the CPU 41 updates the predicted orbit information 424 with the received predicted orbit information (Step S210). The CPU 41 resets the value of the update counter 422 to "0", and resets the update flag 423 to "0" (Step S211). The CPU 41 outputs a predicted orbit information obtaining-completed notification to the external device 7 through the communication unit 53 (Step S212). The CPU 41 then ends the information update control process.

As described above, the electronic timepiece 1 of this embodiment includes: the receiver 54 that receives radio waves from positioning satellites; the communication unit 53 that communicates with the external device 7; the memory 42 that stores the predicted orbit information 424 on the positioning satellites; and the CPU 41. In response to the predetermined condition for the elapsed time from start of the valid period of the stored predicted orbit information 424 being satisfied (two days of three days of the valid period have elapsed, in the above embodiment), the CPU 41 causes the communication unit 53 to receive predicted orbit information subsequent to other information from the external device 7 when the communication unit 53 receives the other information.

Thus, the electronic timepiece 1 does not update the predicted orbit information 424 more often than necessary, and performs the timing setting in such a way as to obtain predicted orbit information subsequent to other information, at the timing of obtaining the other information. That is, the electronic timepiece 1 does not start or end data sending/receiving to obtain predicted orbit information only. Hence, the electronic timepiece 1 can reduce the obtaining frequency (receiving frequency) of the information on the predicted ephemeris, which is needed for positioning, while certainly holding the information, and also reduce the operating frequency of the communication unit 53. Thus, the electronic timepiece 1 can perform a series of processes for positioning (not only actual positioning but also processes for preparation of positioning, for example) more efficiently than a conventional one. The abovementioned technology, which obtains predicted positional information (predicted ephemeris) on positioning satellites in advance via a network and uses the predicted positional information when not holding positional information, consumes power in communications via the network itself. That is, while a conventional electronic timepiece, which merely obtains predicted orbit information regularly, increases power consumption and decreases efficiency according to the obtaining frequency of the predicted orbit information due to the limited capacity of battery, the electronic timepiece 1 can more efficiently perform a series of processes for positioning.

Further, the other information includes the current date-and-time information. The current date-and-time information is received with a proper frequency, at least once a day. Hence, the electronic timepiece 1 can reduce the possibility of failing to obtain the predicted orbit information by synchronizing the receiving timing of the predicted orbit information with the receiving timing of the current date-and-time information. Further, to ensure success of positioning from the first time and improve accuracy of the position, not only accuracy of the ephemeris but also accuracy of the date and time that is counted by the timer circuit 47 are important. Hence, the electronic timepiece 1 obtains the predicted orbit information subsequent to the current date-and-time information. This can avoid a situation where although the electronic timepiece 1 has obtained the predicted orbit information, the positioning result obtained first time does not have a sufficient degree of accuracy because the date and time is incorrect.

Further, a timing at which the current date-and-time information is received includes a timing at which the communication unit 53 and the external device 7 are reconnected after communication connection between the communication unit 53 and the external device 7 is disconnected.

In short-range wireless communications, such as BLE communications, link loss frequently occurs. Hence, the predicted orbit information is likely to be obtained without a long interval after the predetermined condition is satisfied. Further, as an example of the case where communication connection is actively disconnected, there is a case where the electronic timepiece 1 is moved from a time zone to another by the user boarding an airplane. Promptly obtaining the date and time in a correct time zone makes it possible to display the accurate date and time and perform accurate positioning.

Further, the timing at which the current date-and-time information is received includes a timing at which a date-and-time information obtaining command is received from outside. As this timing, the following timings are expected: when the date and time counted by the timer circuit 47 is incorrect (wrong time zone setting included); and before the user goes to an activity (outdoor activity, etc.) that makes it difficult for the user to connect the electronic timepiece 1 with his/her smartphone (external device 7) into contact with one another. At these timings, the user desires to adjust the date and time of the electronic timepiece 1 to the accurate date and time. The electronic timepiece 1 obtains the current date-and-time information at such a timing, and subsequently obtains the predicted orbit information as necessary. This can reduce time taken by positioning from its start until obtainment of the positioning result, and promptly obtain proper accuracy of positioning.

Further, the predetermined condition includes the elapsed time from the start of the valid period of the current predicted orbit information being at least twice the update interval of the predicted orbit information. That is, this makes sure that data of the predicted orbit information is not obtained every time the predicted orbit information is updated, and can reduce power consumption of the electronic timepiece 1.

Further, the remaining time of the valid period at the timing at which the predetermined condition is satisfied is one day or less. That is, by receiving new/updated predicted orbit information on the last day of the valid period of the predicted orbit information 424, the electronic timepiece 1 can sufficiently reduce the possibility of failing to obtain the predicted orbit information, and efficiently perform accurate and prompt positioning with the minimum receiving frequency of the predicted orbit information.

Further, the information update control method of the electronic timepiece 1 includes: in response to the predetermined condition for the elapsed time from start of the valid period of the stored predicted positional information 424 being satisfied, causing the communication unit 53 to receive predicted positional information subsequent to other information from the external device 7 when the communication unit 53 receives the other information. The information update control method does not start or end data sending/receiving to obtain predicted orbit information only. Hence, the information update control method can reduce the obtaining frequency (receiving frequency) of the information on the predicted ephemeris, which is needed for positioning, while certainly holding the information, and also reduce the operating frequency of the communication unit 53. Thus, the information update control method allows the electronic timepiece 1 to perform a series of processes for positioning more efficiently than a conventional one.

Further, by installing and executing, by software, the program 421 that causes a computer of the electronic timepiece 1 to perform the timing setting included in the above-described control process, the electronic timepiece 1 can easily and efficiently perform a series of processes for positioning without using dedicated hardware.

The present invention is not limited to the above embodiment, and can be variously modified.

For example, in the above embodiment, the electronic timepiece 1 obtains (receives) the predicted orbit information when receiving other information from the external device 7, but may obtain (receive) the predicted orbit information when sending other information to the external device 7. For example, the electronic timepiece 1, which has sent information on the elapsed time counted by the stopwatch function to the external device 7, may subsequently obtain the predicted orbit information.

Further, the electronic timepiece 1 may first receive the predicted orbit information and subsequently send/receive other information, if the timing(s) of sending/receiving the other information is predetermined.

Further, in the above embodiment, the update flag 423 and the update counter 422 are provided. However, the update counter 422 being equal to or greater than "2" is equivalent to the update flag 423 being equal to "1". Hence, the update flag 423 may not be provided separately from the update counter 422.

Further, in the above embodiment, the update counter 422 counts the number of elapsed days from the obtaining date of the predicted orbit information, but may count the number of elapsed hours from the obtaining date. In the above embodiment, the valid period of the predicted orbit information starts at 0:00, and hence the number of elapsed days from the obtaining date is equivalent to the number of elapsed days from the start of the valid period as long as the predicted orbit information is obtained on the same day as updated. Instead of counting the number of elapsed days or elapsed hours from the obtaining date, the update counter 422 may perform a process for counting the number of elapsed hours from the start timing of the valid period of the obtained predicted orbit information (the number of elapsed full days from the start time of the valid period, in the case where the valid period does not start at 0:00), or decrease the value of itself by taking the number of days (hours) of the valid period as the initial value.

Further, in the above embodiment, the electronic timepiece 1 sends the value of the update flag 423 to the external device 7 to inform the external device 7 about whether or not the predicted orbit information is needed, but may not send the value of the update flag 423 as long as the electronic timepiece 1 can inform the external device 7 about whether or not the predicted orbit information is needed.

Further, the obtaining/receiving frequency of the predicted orbit information may be determined in accordance with the valid period and the update frequency of the predicted orbit information such that the obtaining/receiving frequency is reduced within a proper range.

Further, in the above embodiment, two types of connection intervals are used by being switched, and the current date-and-time information and the predicted orbit information are continuously received so that a shift to the long connection interval does not occur between the end of the reception of the current date-and-time information and the start of the reception of the predicted orbit information. Alternatively, only one of the types may be used. In this case too, the current date-and-time information and the predicted orbit information are continuously received, namely, between these two, at every connection timing of each short connection interval, a request, a notification, data or the like is sent/received (if necessary in terms of processes, nothing is sent/received at the minimum number of connection timings). When three or more types of connection intervals are settable, from the start of the reception of the current date-and-time information until the end of the reception of the predicted orbit information, no control signal or the like for changing the connection interval is sent/received.

Further, in the above embodiment, as a non-transitory computer-readable storage medium storing the program 421 for control to obtain the positional information, the memory 42 having a nonvolatile memory, such as a flash memory, and/or a mask ROM is cited. However, the non-transitory computer-readable storage medium is not limited thereto. The non-transitory computer-readable storage medium may be a hard disk drive (HDD) or a portable storage medium, such as a CD-ROM or a DVD. Further, as a medium to provide, via a communication line, data of the program(s) of the present invention, a carrier wave may be used.

Besides, the specific details described in the above embodiment, such as configurations, components, settings, control details and control procedures, can be appropriately modified without departing from the scope of the present invention.

In the above, although one or more embodiments have been described, the scope of the present invention is not limited to the embodiments, and includes the scope of claims below and the scope of their equivalents.

What is claimed is:

1. An electronic timepiece comprising:
a radio wave receiver receiving radio waves from positioning satellites;
a communication unit communicating with an external device;
a memory storing a program and predicted positional information on the positioning satellites; and
a processor, based on the program stored in the memory,
in response to a predetermined condition for an elapsed time from a valid period of the stored predicted positional information being satisfied, causing the communication unit to receive predicted positional information with other information from the external device when the communication unit receives the other information, and
after the other information is received, setting a first connection interval relevant to reception of the predicted positional information to be shorter than a second connection interval relevant to maintenance of connection for data communication set for the electronic timepiece and the external device.

2. The electronic timepiece according to claim 1,
wherein the other information includes current date-and-time information.

3. The electronic timepiece according to claim 2,
wherein a timing at which the current date-and-time information is received includes a timing at which the communication unit and the external device are reconnected after communication connection between the communication unit and the external device is disconnected.

4. The electronic timepiece according to claim 3,
wherein the timing at which the current date-and-time information is received includes a timing at which a date-and-time information obtaining command is received from outside.

5. The electronic timepiece according to claim 2,
wherein a timing at which the current date-and-time information is received includes a timing at which a date-and-time information obtaining command is received from outside.

6. The electronic timepiece according to claim 1,
wherein the predetermined condition includes the elapsed time being at least twice an update interval of the predicted positional information.

7. The electronic timepiece according to claim 1,
wherein a remaining time of the valid period at a timing at which the predetermined condition is satisfied is one day or less.

8. The electronic timepiece according to claim 1,
wherein a process of setting the first connection interval is included in a process that is performed after the other information is received.

9. The electronic timepiece according to claim 1,
wherein a process of setting the first connection interval is performed subsequently to the other information being received.

10. The electronic timepiece according to claim 1,
wherein the predetermined condition is that the elapsed time from start of the valid period of the stored predicted positional information is at least twice an update interval of the predicted positional information, and a remaining time of the valid period is one day or less.

11. An information update control method of an electronic timepiece including: a radio wave receiver receiving radio waves from positioning satellites; a communication unit communicating with an external device; and a memory storing predicted positional information on the positioning satellites, the information update control method comprising:
in response to a predetermined condition for an elapsed time from a valid period of the stored predicted positional information being satisfied, causing the communication unit to receive predicted positional information with other information from the external device when the communication unit receives the other information, and
after the other information is received, setting a first connection interval relevant to reception of the predicted positional information to be shorter than a second connection interval relevant to maintenance of connection for data communication set for the electronic timepiece and the external device.

12. The information update control method according to claim 11,
wherein the other information includes current date-and-time information.

13. The information update control method according to claim 12,
wherein a timing at which the current date-and-time information is received includes a timing at which the communication unit and the external device are reconnected after communication connection between the communication unit and the external device is disconnected.

14. The information update control method according to claim 13,
wherein the timing at which the current date-and-time information is received includes a timing at which a date-and-time information obtaining command is received from outside.

15. The information update control method according to claim 12,
wherein a timing at which the current date-and-time information is received includes a timing at which a date-and-time information obtaining command is received from outside.

16. The information update control method according to claim 11,
wherein the predetermined condition includes the elapsed time being at least twice an update interval of the predicted positional information.

17. The information update control method according to claim 11,
wherein a remaining time of the valid period at a timing at which the predetermined condition is satisfied is one day or less.

18. The information update control method according to claim 11,
wherein a process of setting the first connection interval is included in a process that is performed after the other information is received.

19. The information update control method according to claim 11,
wherein a process of setting the first connection interval is performed subsequently to the other information being received.

20. The information update control method according to claim 11,
wherein the predetermined condition is that the elapsed time from start of the valid period of the stored predicted positional information is at least twice an update interval of the predicted positional information, and a remaining time of the valid period is one day or less.

21. A non-transitory computer-readable storage medium storing a program to cause a computer of an electronic timepiece including a radio wave receiver receiving radio waves from positioning satellites and a communication unit communicating with an external device, the storage medium further storing predicted positional information on the positioning satellites, to perform:
in response to a predetermined condition for an elapsed time from a valid period of the stored predicted positional information being satisfied, causing the communication unit to receive predicted positional information with other information from the external device when the communication unit receives the other information, and
after the other information is received, setting a first connection interval relevant to reception of the predicted positional information to be shorter than a second connection interval relevant to maintenance of connection for data communication set for the electronic timepiece and the external device.

* * * * *